(12) United States Patent
Karr

(10) Patent No.: US 7,896,944 B2
(45) Date of Patent: Mar. 1, 2011

(54) METHOD FOR EXTRACTING FULVIC ACID MOLECULES

(75) Inventor: Michael Charles Karr, Monte Vista, CO (US)

(73) Assignee: Lone Knight Limited, Apia (WS)

( * ) Notice: Subject to any disclaimer, the term of this patent is extended or adjusted under 35 U.S.C. 154(b) by 679 days.

(21) Appl. No.: 11/630,277

(22) PCT Filed: Jun. 23, 2004

(86) PCT No.: PCT/CA2004/000935

§ 371 (c)(1),
(2), (4) Date: Jan. 4, 2008

(87) PCT Pub. No.: WO2006/000073

PCT Pub. Date: Jan. 5, 2006

(65) Prior Publication Data

US 2008/0216534 A1 Sep. 11, 2008

(51) Int. Cl.
C05F 11/02 (2006.01)
C07C 55/00 (2006.01)
(52) U.S. Cl. ............... 71/9; 71/24; 423/308; 423/311; 562/590; 562/593
(58) Field of Classification Search ............ 71/6–11, 71/24; 562/590, 593
See application file for complete search history.

(56) References Cited

U.S. PATENT DOCUMENTS 2,992,093 A 3/1958 Burdick
3,398,186 A 8/1968 Schwartz
4,459,149 A 7/1984 Moran et al.
4,786,307 A * 11/1988 Marihart .................. 71/11

(Continued)

FOREIGN PATENT DOCUMENTS

EP 0117223 8/1984

(Continued)

OTHER PUBLICATIONS

Karr, M., 2001. Oxidized Lignites and Extracts from Oxidized Lignites in Agriculture. Unpublished. Available from M. Karr, ARCPACS Cer. Prof. Soil. Sci., 10 Davis St, Monte Vista, CO 81144.

(Continued)

Primary Examiner—Wayne Langel
(74) Attorney, Agent, or Firm—Klarquist Sparkman, LLP

(57) ABSTRACT

Methods for extracting molecules of fulvic acid from a humus material such as oxidized lignite are disclosed. The humus material is mixed with water to solubilize at least some of the fulvic acid molecules. A first filtration apparatus (which may be an ultrafiltration apparatus) may be used to separate at least some of the solubilized fulvic acid molecules from the humin and at least some of the humic acid molecules. A second filtration apparatus (which may be an ultrafiltration apparatus or a nanfiltration apparatus) may be used to then separate the fulvic acid molecules from most of the water and any remaining impurities. A digestion step may also be carried out where microorganisms are brought into contact with the mixture in the presence of oxygen in order to oxidize any unoxidized organic compounds in the humus material. Iron and aluminum may be precipitated and removed by the addition of a phosphate to improve the purity of the end-product.

53 Claims, 2 Drawing Sheets

U.S. PATENT DOCUMENTS

| | | | |
|---|---|---|---|
| 4,952,229 | A | 8/1990 | Muir |
| 5,147,441 | A * | 9/1992 | Megeed .......................... 71/7 |
| 5,178,661 | A | 1/1993 | Cronje et al. |
| 5,204,368 | A | 4/1993 | Cronje et al. |
| 5,213,692 | A | 5/1993 | Hjersted |
| 5,248,327 | A | 9/1993 | Laker et al. |
| 5,281,338 | A | 1/1994 | Harris et al. |
| 5,302,180 | A | 4/1994 | Hjersted |
| 5,411,569 | A | 5/1995 | Hjersted |
| 5,451,240 | A | 9/1995 | Trowbridge |
| 5,486,538 | A | 1/1996 | Seubert et al. |
| 5,491,008 | A | 2/1996 | Joo et al. |
| 5,670,345 | A | 9/1997 | Srivastava et al. |
| 5,688,999 | A | 11/1997 | Lebo, Jr. et al. |
| 5,698,001 | A | 12/1997 | Keenportz |
| 5,854,032 | A | 12/1998 | Srivastava et al. |
| 5,876,479 | A | 3/1999 | Hedgpeth, IV |
| 5,945,446 | A | 8/1999 | Laub |
| 6,113,792 | A | 9/2000 | Benjamin et al. |
| 6,147,229 | A | 11/2000 | Rasmussen et al. |
| 6,204,396 | B1 | 3/2001 | Allen et al. |
| 6,267,962 | B1 | 7/2001 | Hart et al. |
| 6,352,568 | B1 | 3/2002 | Xiong |
| 6,368,849 | B1 | 4/2002 | Norddahl |
| 6,372,007 | B1 | 4/2002 | Munoz |
| 6,406,626 | B1 | 6/2002 | Murakami et al. |
| 6,434,884 | B1 | 8/2002 | Hartung |
| 6,461,399 | B1 | 10/2002 | Connell |
| 6,471,741 | B1 * | 10/2002 | Reinbergen ...................... 71/6 |
| 6,478,946 | B1 | 11/2002 | Westwood |
| 6,558,712 | B1 | 5/2003 | Ghosal |
| 6,569,416 | B1 | 5/2003 | Laub |
| 6,569,900 | B1 | 5/2003 | Dekker et al. |
| 7,261,912 | B2 * | 8/2007 | Zeigler ...................... 426/422 |
| 7,510,590 | B2 * | 3/2009 | Anaya-Olvera ................ 71/11 |
| 2002/0106784 | A1 * | 8/2002 | Reverso ..................... 435/267 |
| 2003/0167811 | A1 * | 9/2003 | Porubcan ......................... 71/6 |
| 2004/0177664 | A1 * | 9/2004 | Hale ............................. 71/11 |
| 2005/0022569 | A1 * | 2/2005 | Varshovi ......................... 71/6 |

FOREIGN PATENT DOCUMENTS

| | | |
|---|---|---|
| EP | 0722921 | 7/1996 |

OTHER PUBLICATIONS

Examination Communication dated Sep. 25, 2008, for EPO Patent Application 04 737 874.0-2404.

International Search Report in respect of International Application No. PCT/CA2004/000935 mailed May 10, 2004.

Karr, M., 2001. Oxidized Lignites and Extracts from Oxidized Lignites in Agriculture. ARCPACS Cer. Prof. Soil. Sci., 10 Davis Street. Monte Vista, CO 81144 (published on the internet (humates.com) at least as early as Jun. 19, 2003).

Crum R H et al.: "A non-adsorptive method for the isolation and fractionation of natural dissolved organic carbon." Water Research, Elsevier Science Publishers, Amsterdam, NL, vol. 30, No. 5, May 1, 1996, pp. 1304-1311.

Duarte R M B O et al.: "Spectroscopic characteristics of ultrafiltration fractions of fulvic and humic acids isolated from an eucalyptus bleached Kraft pulp mill effluent." Water Research, Elsevier Science Publishers, Amsterdam, NL. vol. 37, No. 17, Oct. 2003, pp. 4073-4080.

Written Opinion of the International Searching Authority mailed May 10, 2004.

International Preliminary Examination Report, dated Apr. 12, 2006.

Response Submitted to European Patent Office, dated Aug. 16, 2010, from corresponding European Patent Application No. 04 737 874.0.

EPO Communication under Rule 71(3) EPC dated Apr. 6, 2010, from corresponding European Patent Application No. 04 737 874.0, with attached text approved by EPO.

Voluntary Amendment dated Aug. 9, 2010, filed with the Canadian Intellectual Property Office for corresponding Canadian Patent Application No. 2570565.

* cited by examiner

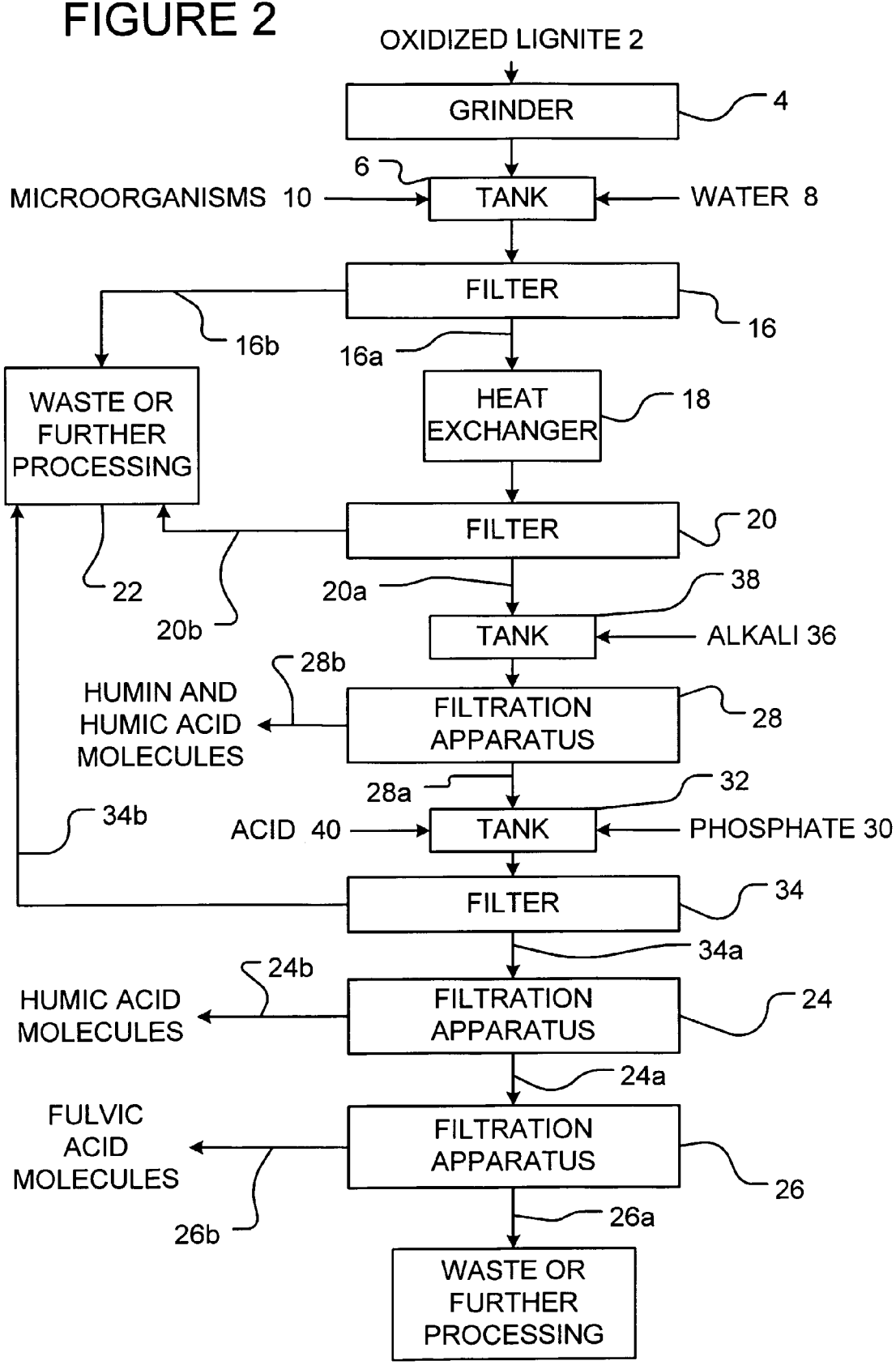

METHOD FOR EXTRACTING FULVIC ACID MOLECULES

CROSS REFERENCE TO RELATED APPLICATIONS

This is the U.S. National Stage of International Application No. PCT/US2004/000935, filed Jun. 23, 2004. This application is incorporated herein in its entirety.

TECHNICAL FIELD

This invention pertains to methods for extracting molecules of fulvic acid from humus material.

BACKGROUND

Humus material is material containing decayed and partially decayed organic material such as plants, animals, microorganisms, and marine life such as plankton. Humus material is formed in nature by the aerobic and anaerobic decomposition of the organic material. Humus material contains humic acid, fulvic acid and humin, which are known collectively as humic substances. While the terms "fulvic acid" and "humic acid" are used extensively in scientific literature sources, these terms each include the plural rather than the singular. In other words, "fulvic acids" and "humic acids" are the correct terms even though "fulvic acid" and "humic acid" are more commonly used. For consistency, the terms "fulvic acid" and "humic acid" are used herein to represent the plural of each of these terms.

The terms fulvic acid, humic acid and humin do not refer to discrete chemical compounds, but each term includes a wide variety of compounds of varying molecular weight, solubilities and spectral characteristics. However, in general terms, the distinction of humic substances as between the categories of humic acid, fulvic acid and humin is based on their solubilities in acidic and alkaline aqueous solutions.

Humin molecules are insoluble under both acidic and alkaline conditions, and have larger molecular weights (generally greater than about 100,000 Daltons) than both humic acid and fulvic acid molecules.

Humic acid molecules are soluble under alkaline conditions, but are insoluble in acidic conditions. The molecular weights of humic acid molecules range from a lower limit from about 2500 to 12,500 Daltons, to an upper limit somewhere from about 75,000 to 300,000 Daltons. Of these, it is the molecules under about 50,000 Daltons which are biologically active. It is known to use humic acid in agricultural applications since these molecules complex nutrients, especially phosphorus and metal micronutrients, keeping the nutrients soluble and available for plant uptake. Humic acid molecules are absorbed and translocated by plants and also stimulate both root and top growth in plants, increase chlorophyll density and may help plants resist drought and heat stress. However, when applied to soils, varying fractions of humic acid will become insoluble, depending on the soil pH. Humic acid will also bind some pesticides, reducing its biological activity.

Fulvic acid molecules are soluble under both acidic and alkaline conditions. Fulvic acid is the lightest fraction of humic substances. There is no consensus in the scientific literature as to the precise molecular weight of fulvic acid molecules, but lower limits range from about 250 to 1,000 Daltons and upper limits range from about 2,500 to 12,500 Daltons, depending upon the method of analysis. It is also known to use fulvic acid in agricultural applications such as fertilizers and soil additives, since fulvic acid has the highest degree of biological activity and nutrient complexing ability among humic substances, and will not bind to most pesticides.

Sources of humus material include peats, peat moss, composts, brown coals, soil, pond sediment, biosolids (sewage sludge) and oxidized lignites. A particular deposit of naturally occurring oxidized lignite, located in North Dakota, U.S.A., is called leonardite.

The most common method used to date for extracting fulvic acid molecules from humus material has been a base-acid extraction wherein the humus material is first contacted with an alkali to solubilize the humic acid and fulvic acid molecules, thus allowing separation of the insoluble humin molecules, followed by acidifying the solution to a pH of about 1-2 to precipitate out the humic acid molecules. One disadvantage to the base-acid extraction method is the cost of using large amounts of acids and bases to carry out the chemical extraction. Further, large scale chemical extraction methods are inconsistent with today's increased environmental awareness. Further still, the base-acid extraction method also leaves reaction salts, iron, silica and other soluble organic compounds such as carbohydrates in solution, thereby decreasing the yield of fulvic acid in the solution and otherwise contaminating the solution. It is desirable to decrease the amount of these impurities from the end solution.

A second method used to date to extract fulvic acid from humus material involves using plain water in place of an alkali. The benefit of this method relative to the base-acid extraction method is fewer salts in the end solution, but the resultant fulvic acid solution does still contain some iron and other soluble organic compounds. However, a disadvantage to the water extraction method is that the yields are extremely low, and for this reason the base-acid extraction method is used to produce almost all currently commercially available fulvic acid products.

Also, it is advantageous for fulvic acid products to be produced in such a manner that they can be used in agricultural applications wherein the produce or crops produced thereby can be certified as "organic".

The need has therefore arisen for a commercially-viable yet environmentally sensitive method for extracting molecules of fulvic acid from humus material.

SUMMARY OF INVENTION

According to one aspect, the invention provides for methods for extracting molecules of fulvic acid from a humus material comprising molecules of humin, humic acid and fulvic acid, the method comprising the steps of: (a) mixing the humus material with water to solubilize at least some of the molecules of fulvic acid; and (b) separating at least some of the solubilized fulvic acid molecules from the humin molecules and from at least some of the humic acid molecules by ultrafiltration.

The methods may also comprise between steps (a) and (b), a digestion step comprising contacting microorganisms with the mixture in the presence of oxygen to oxidize any unoxidized organic compounds in the humus material. The microorganisms may be bacteria, protozoa, fungi or a mixture of two or more of bacteria, protozoa and fungi. The microorganisms may be contacted with the mixture by adding compost, compost tea, soil or manure to the mixture, the compost, compost tea, soil or manure comprising the microorganisms. Air may be bubbled through the mixture during the digestion step.

At least some of the solubilized fulvic acid molecules may be separated from at least some of the humic acid molecules by filtering the mixture through a first filtration apparatus which retains at least some of the humic acid molecules while allowing at least some of the solubilized fulvic acid molecules to pass through, wherein at least some of the solubilized fulvic acid molecules are separated from the humin molecules before or during filtering the mixture through first filtration apparatus. The first filtration apparatus may be an ultrafiltration apparatus. The first filtration apparatus may retain particles or compounds having a molecular weight of at least about 2500 to 12,500 Daltons including, for example, particles or compounds having a molecular weight of at least about 8000 Daltons. The first filtration apparatus may allow all or substantially all of the solubilized fulvic acid molecules to pass through. The first filtration apparatus may retain all or substantially all of the humic acid molecules.

The methods may also include, after step (b), the step of (c) separating at least some of the solubilized fulvic acid molecules from part of the water by ultrafiltration or nanofiltration. Step (c) may be carried out by filtering the mixture through a second filtration apparatus after being filtered through the first filtration apparatus, wherein the second filtration apparatus retains at least some of the solubilized fulvic acid molecules while allowing part of the water to pass through. The second filtration apparatus may be, for example, an ultrafiltration apparatus or a nanofiltration apparatus. The second filtration apparatus may retain all or substantially all of the fulvic acid molecules which have passed through the first filtration apparatus. The second filtration apparatus may retain particles or molecules having a molecular weight of at least about 250 to 1000 Daltons including, for example, particles or molecules having a molecular weight of at least about 600 Daltons. The second filtration apparatus may retain part of the water, thereby leaving the separated fulvic acid molecules from step (c) in a solution. The methods may also include reducing the water content of the solution obtained from step (c) to concentrate the solution. The solution obtained from step (c) may be dried to leave the fulvic acid in a powder.

The methods may also include filtering the mixture through a third filtration apparatus before being filtered through the first filtration apparatus, wherein the third filtration apparatus retains the humin molecules and at least some of the humic acid molecules while allowing the solubilized fulvic acid molecules and at least some of the humic acid molecules to pass through. The third filtration apparatus may be an ultrafiltration apparatus. The third filtration apparatus may retain particles or molecules having a molecular weight of more than about 12,500 Daltons, including for example, particles or molecules having a molecular weight of at least about 25,000 Daltons. All or substantially all of the humic acid molecules may be retained by one or both of the first filtration apparatus and the third filtration apparatus.

The methods may also include, after step (a) but before filtering the mixture through the first filtration apparatus, the steps of adjusting the pH of the mixture to about 5 to 8, adding a phosphate to the mixture to precipitate any iron and any aluminum in the humus material as iron phosphate and aluminum phosphate and separating any precipitated iron phosphate and aluminum phosphate from the fulvic acid molecules.

The phosphate may be selected from the group consisting of monopotassium phosphate, dipotassium phosphate, tripotassium phosphate, sodium pyrophosphate, magnesium phosphate, calcium phosphate, and mixtures of two or more of monopotassium phosphate, dipotassium phosphate, tripotassium phosphate, sodium pyrophosphate and calcium phosphate. The phosphate could also be phosphoric acid.

The addition of the phosphate to the mixture may be sufficient to adjust the pH of the mixture to about 5 to 8, or alternatively an acid or an alkali may be added to the mixture to adjust the pH of the mixture to about 5 to 8. The acid may be selected from phosphoric acid, acetic acid, citric acid, hydrochloric acid and sulfuric acid and mixtures of two or more of phosphoric acid, acetic acid, citric acid, hydrochloric acid and sulfuric acid. The alkali may be selected from monopotassium phosphate, dipotassium phosphate, tripotassium phosphate, sodium carbonate, sodium bicarbonate, potassium bicarbonate, calcium carbonate, calcium-magnesium carbonate, potassium hydroxide and sodium hydroxide and mixtures of two or more of monopotassium phosphate, dipotassium phosphate, tripotassium phosphate, sodium pyrophosphate, magnesium phosphate, calcium phosphate, sodium carbonate, sodium bicarbonate, potassium bicarbonate, calcium carbonate, calcium-magnesium carbonate, potassium hydroxide and sodium hydroxide.

Where the third filtration apparatus is present, the phosphate addition step may be carried out after filtering the mixture through the third filtration apparatus and before filtering through the first filtration apparatus. The pH of the mixture may be adjusted to at least about 9.4 (for example by the addition of an alkali) prior to filtering the mixture through the third filtration apparatus and wherein the pH of the mixture is adjusted, by the addition of an acid, to about 5 to 8 after filtering the mixture through the third filtration apparatus.

The humus material may comprise one or more of peats, oxidized lignites, peat moss, composts, brown coals, soil, pond sediment and biosolids. For example, the humus material may comprises oxidized lignite, and the oxidized lignite may be leonardite. The humus material may be ground prior to being mixed with the water in step (a). The mixture in step (a) may comprise from about 3% to about 35% by weight of the humus material. The mixture may be heated prior to step (b), for example, at a temperature from about 50° C. to 70° C. The mixture may be allowed to settle prior to step (b).

The methods may also include filtering the mixture to remove particles of a chosen size prior to filtering the mixture through the first filtration apparatus.

The water in step (a) may be provided in an aqueous solution which is mixed with the humus material.

In another aspect, the invention provides for methods for producing an agricultural or horticultural solution comprising fulvic acid molecules, the method comprising: (a) mixing a humus material comprising molecules of humin, humic acid and fulvic acid with water to solubilize at least some of the fulvic acid molecules; (b) filtering the mixture through a first filtration apparatus which is configured to retain particles or molecules having a molecular weight of at least 2500 to 12,500 Daltons to separate at least some of the fulvic acid molecules from at least some of the humic acid molecules, the humin molecules being separated from the fulvic acid molecules prior to or during filtering the mixture through the first filtration apparatus; and (c) passing the filtrate from the first filtration apparatus through a second filtration apparatus, wherein the second filtration apparatus retains at least some of the solubilized fulvic acid molecules and some of the water, thereby producing the solution. The methods may include a digestion step comprising contacting microorganisms with the mixture in the presence of oxygen to oxidize any unoxidized organic compounds in the humus material. The second filtration apparatus may be configured to retain particles or molecules having a molecular weight of at least about 250 to 1000 Daltons. The mixture may be filtered through a third filtration apparatus prior to being filtered through the first filtration apparatus, the third filtration apparatus retaining the humin molecules and at least some of the humic acid molecules while allowing the solubilized fulvic acid molecules to pass through, wherein the third filtration apparatus is configured to retain particles or molecules having a molecular weight of more than about 12,500 Daltons. The methods may also include, after filtering the mixture through the third filtration apparatus and before filtering the mixture through the first filtration apparatus, the steps of adjusting the pH of the mixture to about 5 to 8, adding a phosphate to the mixture to precipitate any iron and any aluminum in the humus material as iron phosphate and aluminum phosphate and separating any precipitated iron phosphate and aluminum phosphate from the fulvic acid molecules.

In yet another aspect, the invention provides for methods for extracting molecules of fulvic acid from a humus material comprising molecules of humin, humic acid and fulvic acid, the method comprising the steps of: (a) mixing ground humus material with water to solubilize at least some of the fulvic acid molecules; (b) contacting microorganisms with the mixture in the presence of oxygen for a period of 1 to 7 days to oxidize any unoxidized organic compounds in the humus material; (c) adding a phosphate to the mixture and adjusting the pH of the mixture to about 5 to 8 to precipitate any iron and any aluminum in the humus material as iron phosphate and aluminum phosphate, wherein any precipitated iron phosphate and aluminum phosphate is removed in one or more of steps (d), (g) and (h); (d) passing the mixture through a first filter, the pores of the first filter being sized to retain particles have a size of at least 74 microns, the filtrate from the first filter comprising a mixture of a solution comprising fulvic acid molecules and solids having sizes smaller than about 74 microns; (e) allowing the filtrate from the first filter to settle for a period of time; (f) heating the filtrate from the first filter at temperature from about 50° C. to 70° C.; (g) passing the filtrate from the first filter through a second filter, the pores of the second filter being sized to retain particles having a size of at least about 5 to 30 microns, the filtrate from the second filter comprising a mixture of a solution comprising the solubilized fulvic acid molecules and particles having sizes smaller than about 5 to 30 microns; (h) passing the filtrate from the second filter through a first filtration apparatus, wherein the first filtration apparatus is an ultrafiltration apparatus which retains all or substantially all of the remaining humin and humic acid molecules while allowing the solution comprising the solubilized fulvic acid molecules to pass through; (i) passing the filtrate from the first filtration apparatus through a second filtration apparatus, wherein the second filtration apparatus is an ultrafiltration apparatus or a nanofiltration apparatus, and wherein the second filtration apparatus retains all or substantially all of the fulvic acid molecules while allowing at least part of the water to pass through.

In yet another aspect, the invention provides for methods for extracting molecules of fulvic acid from a humus material comprising molecules of humin, humic acid and fulvic acid, the method comprising the steps of: (a) mixing ground humus material with water to solubilize at least some of the fulvic acid molecules; (b) contacting microorganisms with the mixture in the presence of oxygen to oxidize any unoxidized organic compounds in the humus material; (c) filtering the mixture through a first filtration apparatus, wherein the first filtration apparatus retains the humin molecules and at least some of the humic acid molecules while allowing the solubilized fulvic acid molecules to pass through, wherein a third filtration apparatus is configured to retain particles or molecules having a molecular weight of more than about 12,500 Daltons; (d) adjusting the pH of the mixture to about 5 to 8; (e) adding a phosphate to the mixture to precipitate any iron and any aluminum in the humus material as iron phosphate and aluminum phosphate; (f) removing any precipitated iron phosphate and aluminum phosphate from the mixture; (g) filtering the mixture through a second filtration apparatus to separate at least some of the fulvic acid molecules from at least some of the humic acid molecules, wherein the second filtration apparatus is configured to retain particles or molecules having a molecular weight of at least 2500 to 12,500 Daltons; and (h) filtering the mixture through a third filtration apparatus, wherein the third filtration apparatus retains all or substantially all of the fulvic acid molecules which passed through the second filtration apparatus while allowing at least part of the water to pass through, wherein the third filtration apparatus is configured to retain particles or molecules having a molecular weight of at least 250 to 1000 Daltons.

In another aspect, the invention provides for fulvic acid products comprising fulvic acid molecules extracted from a humus material according to the methods of the invention, including solutions produced according to the method of the invention.

Further aspects of the invention and features of specific embodiments of the invention are described below.

BRIEF DESCRIPTION OF THE DRAWINGS

FIG. 2 is a flow chart of a method for extracting fulvic acid molecules in accordance with another embodiment of the present invention.

DESCRIPTION

Figure 1:
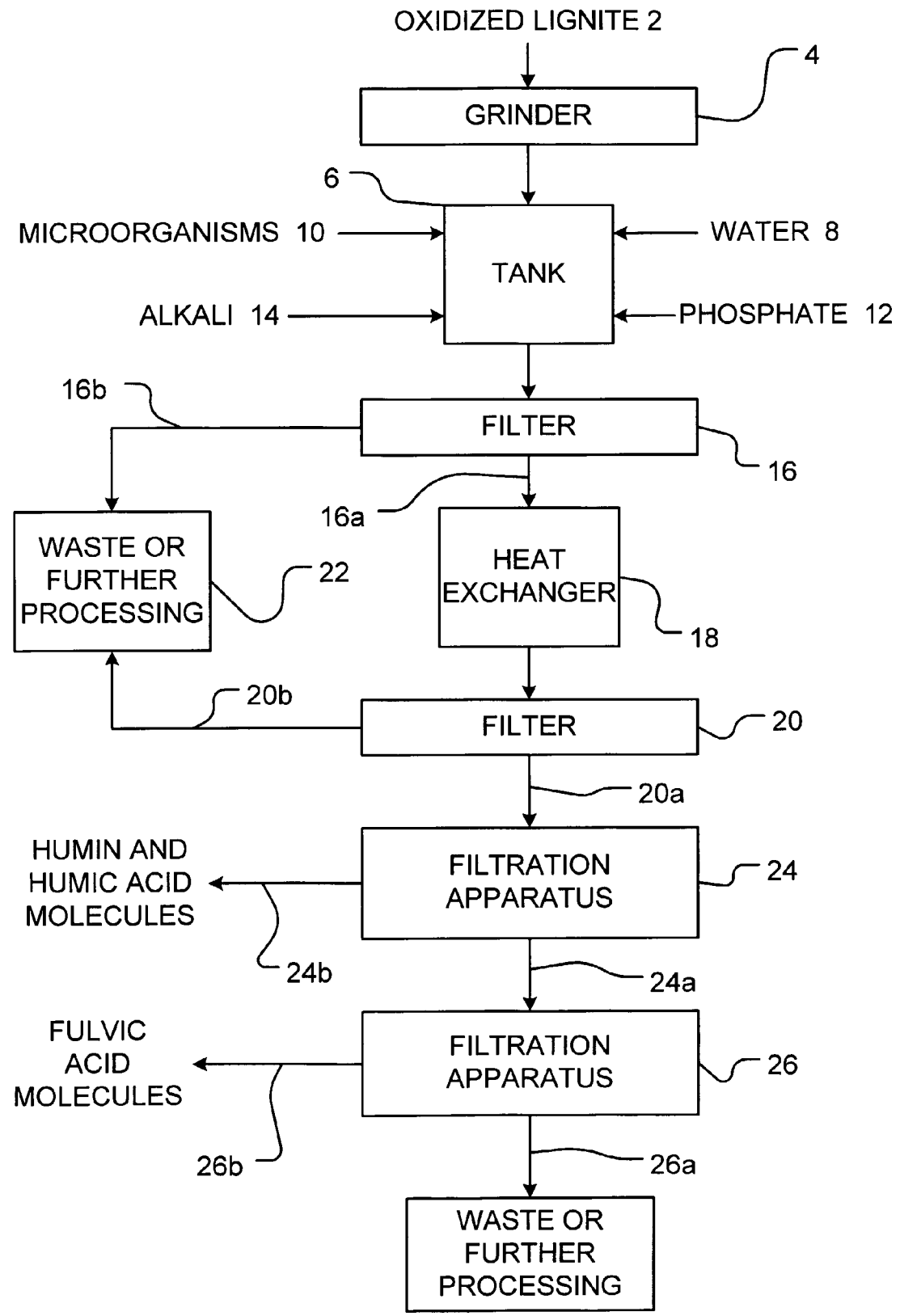
FIG. 1 is a flow chart of a method for extracting fulvic acid molecules in accordance with one embodiment of the present invention.

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

It should be noted that at pH levels from about 3 to 12 humic acid and fulvic acid molecules are typically found in their "salt" forms wherein the molecules are electrostatically bonded to a cation such as potassium, magnesium, calcium or sodium. Thus, humic acid and fulvic acid molecules at most natural pH levels occur as "salts" such as potassium humate, calcium humate, magnesium fulvate or sodium fulvate (the terms "humates" and "fulvate" refer to the salts of humic acid molecules and fulvic acid molecules, respectively). As used herein, the terms "fulvic acid molecules" and "molecules of fulvic acid" include not only fulvic acid molecules but also salts of fulvic acid molecules, and the terms "humic acid molecules" and "molecules of humic acid" include not only humic acid molecules but also salts of humic acid molecules.

Some previous methods for extracting fulvic acid have utilized a base-acid chemical extraction process. In contrast the present invention involves a more environmentally sensitive method involving a physical process such as ultrafiltration. That is, the methods of the present invention may use ultrafiltration to separate fulvic acid molecules from the generally higher molecular weight molecules of humin and humic acid. Thus, in one aspect, the invention provides for methods for extracting molecules of fulvic acid from a humus material comprising molecules of humin, humic acid and fulvic acid, the method comprising the steps of: (a) mixing the humus material with water to solubilize at least some of the molecules of fulvic acid; and (b) separating at least some of the solubilized fulvic acid molecules from humin molecules and from at least some of the humic acid molecules by ultrafiltration.

The methods of the present invention may also optionally include a biological process, in particular, digestion by microorganisms, to enhance the yield of fulvic acid molecules obtained by the methods. Many other optional aspects of the invention are disclosed herein.

FIG. 1 is a flow chart of a method for extracting fulvic acid molecules from a humus material in accordance with one embodiment this invention. Oxidized lignite is a source of humus material and will be used herein for illustration purposes. Leonardite is an example of an oxidized lignite. It will be appreciated that other sources could also be used as a source of humus material. Examples of such sources of humus material include, for example, peats, peat moss, composts, brown coals, soil, pond sediment, biosolids (sewage sludge) and mixtures of two or more of these sources. Another example of a source of humus material would be a mixture of oxidized lignite(s) with one or more of the sources mentioned above.

Oxidized lignite 2 is preferably ground into an acceptable size, for example by using a grinder 4. Oxidized lignite 2 contains molecules of fulvic acid, humic acid and humin which are in the solid state. Oxidized lignite 2 is ground in grinder 4 to smaller forms, such as dust and particles. It is preferable to grind the oxidized lignite into as small a size of particles as possible since this will increase the surface area for later steps in the method, thereby increasing yields. For example, the oxidized lignite may be ground so that all particles pass through a 200 mesh (about 74 micron) screen, or even smaller. As another example, the oxidized lignite may be ground to an average particle size of about 6 microns. While it is within the scope of the invention to grind the oxidized lignite to larger sizes (e.g. so that it is all capable of passing through a 50 mesh screen), these larger particles sizes will produce lower yields, or will require multiple extractions (at increased cost) to produce comparable yields.

The ground oxidized lignite 2 is conveyed from the grinder 4 to a tank 6 where it is mixed with water 8 to form a mixture. The water will solubilize at least some, and preferably all or substantially all, of the molecules of fulvic acid upon being mixed with the ground oxidized lignite 2, however some fulvic acid molecules may be entrained in solid materials and thus not solubilized at this point. The humin molecules remain insoluble, as may at least some of the humic acid molecules (it is possible that some lighter humic acid molecules will be solubilized at this stage). There may also be some small particulate matter left in the mixture from the humus material, such as silica and other lower molecular weight molecules such as sugars. The mixture is thus formed of a solution comprising the solubilized fulvic acid molecules and any solubilized humic acid molecules, and the remaining insoluble solid matter (e.g. humin molecules, humic acid molecules, silica, sugars and the like).

The water-oxidized lignite (humus material) mixture preferably comprises between about 3% to 35%, and most preferably 10%, by weight of oxidized lignite (humus material). For example, about 1000 lbs. of ground oxidized lignite may be mixed with about 900 gallons of water. The relative amount of humus material in the mixture may vary depending what source of humus material is used.

The mixture may then be brought into contact with microorganisms 10 and allowed to digest for a period of time. For example, the mixture may be inoculated with microorganisms 10. The microorganisms 10 may be bacteria, fungi, protozoa or mixtures thereof. The mixture is brought into contact with the microorganisms 10 in the presence of oxygen. For example, in one arrangement tank 6 may be open at its top such that the mixture is open to the air atmosphere (which comprises oxygen). It will be appreciated that many other arrangements are possible whereby oxygen is present during the digestion step. For example, fine bubbles of air (comprising oxygen) may be dispersed through the mixture via a suitable apparatus (not shown) during the digestion step to not only provide oxygen, but also to provide gentle agitation to promote the digestion of the mixture. It will also be appreciated by those skilled in the art that oxygen could be provided during the digestion step not only by air (whether by the surrounding atmosphere and/or in bubbles which are dispersed into the mixture) but by any other gas that includes oxygen.

During the digestion step, the microorganisms 10 "consume" or oxidize unoxidized organic compounds in the humus material. This advances the humification process for these unoxidized organic compounds, resulting generally in an increase in the content of fulvic acid and humic acid molecules, accompanied by the breaking apart of particles and greater release of fulvic acid molecules from the solid particles and into the solution, thus providing increased yields. Also, the consumption of the unoxidized organic compounds by the microorganisms 10 thus reduces the presence of the organic compounds in the final fulvic acid solution extracted by the methods of the present invention relative to a base-acid and water extraction methods, increasing the purity of the fulvic acid solution produced by methods of the present invention. Again, it is preferable for the starting oxidized lignite particles to be ground to as small a size as possible to increase the surface area for this digestion by the microorganisms 10.

There are a wide variety of naturally present microorganisms in soils and compost. Thus, the microorganisms 10 may be added to the mixture by the addition of compost or soil which includes the microorganisms 10, or similarly, by the addition of a compost tea or manure which includes the microorganisms 10. Compost tea is compost that has been extracted with water over a period of approximately 12 to 72 hours.

The precise times for the digestion step will depend upon many factors, including the amount of unoxidized organic compounds in the starting humus material, as well as the diversity and total number of microorganisms in the material which contain the microorganisms 10. For example, using the specific amounts of water (900 gallons) and ground oxidized lignite (1000 lbs.) mentioned above, about 25 to 250 lbs. of well aged compost or compost tea may be added to the mixture and the mixture may be digested for about 1 to 7 days. In one aspect, 75 lbs. of the well aged compost or compost tea may be added to the mixture and the mixture may be digested for about 3 days.

Tank 6 may be fitted with a mechanical agitator (not shown) to provide agitation to the mixture during the digestion step.

Small amounts of a phosphate 12 may then be added to the mixture for the purpose of removing any iron and aluminum and to separate out any fulvic acid molecules from the solids. In particular, a phosphate may be added to the mixture to precipitate any iron (trivalent iron) in the humus material as iron phosphate, which is least soluble at a pH from about 5 to 8 (the solubility of iron phosphate increases substantially above a pH of 8). The phosphate may also bind with any aluminum present. Any precipitated iron phosphate and aluminum phosphate can be removed from the mixture, for example, by filtration. The removal of iron and aluminum is preferred since they tend to flocculate organic compounds and clays. The dispersal of particles resulting from the removal of iron and aluminum, and the partial unfolding of humic acid and fulvic acid molecules allows the release of these molecules, thus increasing the yield of the fulvic acid molecules.

The phosphate 12 added to the mixture may be, for example, monopotassium phosphate, dipotassium phosphate, tripotassium phosphate, sodium pyrophosphate, magnesium phosphate or calcium phosphate (rock phosphate). The specific amount of the phosphate added will depend upon the iron and aluminum content in the starting humus material. When water is used to form the mixture with leonardite, the pH of the starting mixture is about 4.5 to 4.8, and it is necessary to increase the pH of the mixture in order to precipitate iron phosphate and aluminum phosphate. This may be accomplished by simply adding a sufficient amount of the phosphate 12 without the addition of an additional alkali, or alternatively, may be accomplished by the addition of an additional alkali including, for example, any of the following: monopotassium phosphate, dipotassium phosphate, tripotassium phosphate, sodium pyrophosphate, magnesium phosphate, calcium phosphate, sodium carbonate, sodium bicarbonate, potassium bicarbonate, calcium carbonate (lime), calcium-magnesium carbonate (dolomitic lime), potassium hydroxide and sodium hydroxide. This optional step is illustrated in FIG. 1 by the addition of alkali 14.

It is within the scope of the present invention to utilize an aqueous solution rather than plain water to solubilize the fulvic acid molecules in tank 6. That is, the water 8 could be provided to tank 6 as part of an aqueous solution which is then mixed with oxidized lignite 2. It should be possible to use any water-based solution that solubilizes fulvic acid molecules when mixed with the humus material without substantially degrading the humic substance molecules. The aqueous solution can be any water-based solution having a pH ranging from mildly acidic to very alkaline. Examples of such aqueous solutions include, without limitation, hydroxide solutions and carbonate solutions.

If water 8 is provided to tank 6 as part of an alkaline aqueous solution, then it may be necessary to lower the pH of the mixture to the desired range of about 5 to 8 for the phosphate addition step through the addition of an acidic compound. For example, phosphoric acid could be used not only as phosphate 12, but also as an acid (not shown) which would be introduced into tank 6 in place of alkali 14. Other examples of an acid that could be used for this purpose are acetic acid, citric acid, hydrochloric acid and sulfuric acid. Mixtures of two or more of these acids (including phosphoric acid) could also be used.

The contents of tank 6 may (but need not be) filtered through any number of filters to remove solids of a chosen size before being filtered through filtration apparatus 24. FIG. 1 illustrates an embodiment of the invention wherein two filters 16 and 20 are present. In one aspect, first filter 16 comprises a 200 mesh screen, such that the pores are sized to retain particles having a size of at least about 74 microns. Filters having differently sized pores could alternatively be used depending upon the size of solids which are desired to be removed.

The solid retentate 16b retained by first filter 16 may be transferred to unit 22 to be discarded or further processed depending on a user's needs and the particular solids retained by first filter 16.

The filtrate 16a from first filter 16 comprises a mixture of the solution comprising the solubilized fulvic acid molecules and any solubilized humic acid molecules, and the remaining solids (e.g. humin molecules, humic acid molecules, and other particulate matter) some of which are in suspension. The filtrate 16a may be allowed to settle for a period of time such as, for example, about 2 to 10 days, including preferably about 5 to 7 days. Some fulvic acid molecules may be entrained with other molecules in some of the remaining solid matter. The filtrate 16a may be heated to help release some of these fulvic acid molecules to increase yield of the fulvic acid molecules. The heating may be accomplished by passing the filtrate 16a from the first filter 16 through a heat exchanger 18, or by some other conventional heating means. Preferably the mixture is heated to about 50° C. to 70° C. and need only take place for a short period of time. The heating step breaks down hydrogen bonds, thus increasing the unfolding and separation of fulvic acid molecules from other components.

The mixture may then be passed through a second filter 20 in order to help prevent fouling of filtration apparatus 24. In one aspect, the pores of the second filter 20 may be sized to retain particles having a size of at least about 5 to 30 microns. For example, a 20 micron filter may be used as second filter 20. The solid retentate 20b retained by second filter 20 may be transferred to unit 22 to be discarded or processed further depending on a user's needs and the particular solids retained by second filter 20.

The filtrate 20a from the second filter 20 is passed through a first filtration apparatus 24. First filtration apparatus is configured to allow passage therethrough of at least some, and preferably all or substantially all, of the solubilized fulvic acid molecules in filtrate 20a. Filtration apparatus 24 may be an ultrafiltration apparatus such as an ultrafiltration membrane array.

Ultrafiltration is a membrane separation technique used to remove or separate small substances which range in size from ionic to molecular. Such substances are so small that they typically are measured in nanometers or molecular weight. Membranes of differing types have been developed with mass transfer properties and pore sizes such that ionic, molecular and organic substances measuring between 0.1 and 100 nanometers can be removed or rejected. Generally, a particle size of 1 nanometer corresponds to a molecular weight of about 1000 Daltons, though more highly charged molecules require larger pore sizes to pass through the membrane than molecules of similar molecular weight that are neutral, polar or have a lower charge.

Ultrafiltration is a selective fractionation process that separates particles on the basis of size. Ultrafiltration is carried out at low pressure, typically 10 bars (145 psi). Typically ultrafiltration apparatuses retain particles (suspended solids and dissolved solutes) having sizes greater than about 1.0 to 20 nanometers, or molecular weights of at least about 1000 to 200,000 Daltons, though there are some commercially-available ultrafiltration apparatuses having a molecular weight cut-off as low as 500 Daltons. Ultrafiltration apparatuses are available with membranes of any number of different pore sizes. For examples, it is possible to select ultrafiltration apparatuses having a molecular weight cut-off of 8000 Daltons, of 10,000 Daltons, of 15,000 Daltons, etc.

Other than ultrafiltration, other membrane separation techniques include nanofiltration, microfiltration and reverse osmosis.

Nanofiltration is a membrane separation technique used to separate desirable components in a solution from those which are not desirable. Typically, nanofiltration apparatuses permit the passage of monovalent ions and low-molecular weight organic solutions (such as alcohol) while rejecting organic solutes, suspended solids and polyvalent ions. Nanofiltration has been used in separation applications such as demineralization, color removal and some desalinisation. Nanofiltration membranes have larger pore sizes than reverse osmosis membranes, but nanofiltration does not require as much energy to carry out the separation (higher pressures are required in reverse osmosis techniques). Nanofiltration apparatuses typically have a molecular weight cut-off of about 600 Daltons, though nanofiltration membranes offering molecular weight cut-off levels as low as 200-300 Daltons or above 600 Daltons are available.

As noted above, filtration apparatus 24 may be an ultrafiltration apparatus such as an ultrafiltration membrane array. The filtrate 20a from second filter 20 is passed through filtration apparatus 24 to separate at least some (and preferably all or substantially all) of the solubilized fulvic acid molecules from humin molecules, other heavier particles and at least some (and preferably all or substantially all) of the humic acid molecules. That is, first filtration apparatus 24 retains the humin molecules and at least some of the humic acid molecules (some lower weight humic acid molecules may pass through filtration apparatus 24 if a filtration apparatus having a high enough molecular weight cut-off is selected) while allowing the solution comprising at least some of the solubilized fulvic acid molecules to pass through as filtrate 24a (some of the fulvic acid molecules may be retained by filtration apparatus 24 if a filtration apparatus having a low enough molecular weight cut off is selected). The molecular weight cut off level of filtration apparatus 24 is preferably in the range of about 2,500 to 12,500 Daltons, since this range corresponds with the upper end of the molecular weight range for fulvic acid molecules (and the lower end of the molecular weight range for humic acid molecules). For example, an 8000 Dalton ultrafiltration membrane array may be used as filtration apparatus 24 according to one aspect of the invention. Using such an filtration apparatus allows the separation of the fulvic acid molecules having a molecular weight below 8000 Daltons from those molecules having a molecular weight greater than 8000 Daltons, such as humin molecules and at least some humic acid molecules (some humic acid molecules may have a molecular weight lower than 8000 Daltons and thus may pass through in filtrate 24a). If there are fulvic acid molecules present with a molecular weight greater than 8000 Daltons, these molecules will also be retained in retentate 24b.

The retentate 24b from filtration apparatus 24 includes humin molecules, humic acid molecules and other various small particulate matter from the starting humus material and any fulvic acid molecules with a molecular weight higher than the molecular weight cut-off level of filtration apparatus 24. The retentate 24b may be processed further if desired. The humic acid portion of this retentate in particular may be extracted for use in any number of different agricultural applications. The filtrate 24a from the filtration apparatus 24 may be passed through a second filtration apparatus 26. The purpose of filtration apparatus 26 is to separate the solubilized fulvic acid molecules from filtrate 24a from part of the water and any salts and/or any other remaining low molecular weight molecules which are in filtrate 24a. Filtration apparatus 26 retains, as retenate 26b, the solubilized fulvic acid molecules from the filtrate 24a along with a part of the starting water, while the remaining portion of the water and any salts and any other remaining low molecular weight molecules pass through filtration apparatus 26 as filtrate 26a. It is the retentate 26b (comprising the fulvic acid molecules) from filtration apparatus 26 that is maintained as the end-product, while the filtrate 26a (comprising part of the starting amount of water, salts, and any other remaining low molecular weight molecules) is discarded or processed further depending on a user's needs and the composition of the filtrate 26a (for example, the filtrate from ultrafiltration apparatus 26 could be used as a dilute source of fertilizer nutrients). If filtration apparatus 26 is not used in a method, then filtrate 24a from filtration apparatus 24 is the end product of the method.

While most of the water is passed through filtration apparatus 26 as part of the filtrate 26a, some water will be retained, meaning that the fulvic acid molecules in retentate 26b are in solution. This fulvic acid solution can be sold as is, or can be processed further if that is desired. For example, further concentration could be accomplished by reducing water content via a low temperature film or a falling film evaporator (not shown). Alternatively, drying to a powder form can be done using conventional low temperature methods, or by freeze drying (not shown).

The molecular weight cut-off level of filtration apparatus 26 is lower than the molecular weight cut-off level of filtration apparatus 24, and will preferably be in the range of about 250 to 1000 Daltons, since this corresponds with the lower molecular weight range limit for fulvic acid molecules. Since ultrafiltration and nanofiltration techniques can be used to separate molecules in this molecular weight cut-off range, filtration apparatus 26 may be, for example, an ultrafiltration apparatus or a nanofiltration apparatus. In one aspect of the invention, an 600 Dalton ultrafiltration membrane array may be used as filtration apparatus 26.

The particular molecular weight cut-off levels for filtration apparatuses 24 and 26 mentioned above are merely examples that can be used. Those skilled in the art will appreciate that filtration apparatuses with different molecular weight cut-off levels than 8000 Daltons and 600 Daltons could be used, respectively, as filtration apparatuses 24 and 26.

It will also be appreciated that the particular molecular weight cut-off level selected for filtration apparatuses 24 and 26 will affect the end-product obtained. For example, using a more porous filtration apparatus as filtration apparatus 24 (e.g. having a higher molecular weight cut-off level) will result in the passing through of not only more fulvic acid molecules but also some of the lower molecular weight humic acid molecules as well, meaning that these molecules will pass through as part of filtrate 24a and eventually be part of the retentate 26b from filtration apparatus 26, resulting in a somewhat less pure end-product than would be obtained if a higher molecular weight cut-off ultrafiltration apparatus were used. Conversely, using an less porous filtration apparatus as filtration apparatus 24 (e.g. having a lower molecular weight cut-off level) will result in less impurities in retentate 26b (since more compounds and particles would be retained by filtration apparatus 24), but may also possibly result in a somewhat decreased yield of fulvic acid molecules in retenate 26b since some fulvic acid molecules having a higher molecular weight might also be retained by filtration apparatus 24. Similarly, using a more porous filtration apparatus as filtration apparatus 26 (e.g. having a higher molecular weight cut-off level) will result in the retention of less fulvic acid molecules, thus decreasing the fulvic acid molecule content in retentate 26b, while using an less porous filtration apparatus as filtration apparatus 26 (e.g. having a lower molecular weight cut-off level) would result in more fulvic acid molecules and thus a higher yield of fulvic acid molecules in the end product, but also possibly more impurities as well.

These factors need to be assessed when selecting the particular filtration apparatuses as filtration apparatuses 24 and 26, having regard the characteristics of the starting humus material and the particular qualities and yields sought in retenate 26b. It has been found that using an ultrafiltration membrane array having a molecular weight cut-off level of 8000 Daltons provides a satisfactory fulvic acid yield in retenate 26b without the retentate solution losing its spectral characteristics. Similarly, the 600 Dalton ultrafiltration membrane array has been selected to be used as filtration apparatus 26 in one aspect of the invention to increase the water and salt removal. It has been found that using a 600 Dalton ultrafiltration membrane array as filtration apparatus 26 will retain about 20% of the starting water in retenate 26b while allowing about 80% of the water to pass through as part of filtrate 26a.

It may be desirable to utilize additional separation membrane(s) prior to filtering the mixture through filtration apparatus 24, in order to improve the efficiency of filtration apparatus 24 and to reduce the possibility of fouling of filtration apparatus 24. FIG. 2 illustrates a flow chart of a method for extracting fulvic acid molecules from a humus material according to another embodiment of the invention wherein an additional filtration apparatus 28 is used in addition to filtration apparatuses 24 and 26. The method illustrated in FIG. 2 is similar to the method illustrated in FIG. 1 with a few differences. Like numerals have been used where there are like elements as between the methods illustrated in FIGS. 1 and 2.

Filtration apparatus 28 is used to filter the mixture prior to being filtered through filtration apparatus 24 as discussed above, in order to separate out molecules or particles having a chosen molecular weight which would otherwise be retained within the retentate 24b of filtration apparatus 24. This will improve the efficiency of filtration apparatus 24 and reduce the prospects of filtration apparatus 24 being fouled due to excess retained molecules and particles.

Filtration apparatus 28 is configured to retain the humin molecules and at least some of the humic acid molecules (the relative amount of humic acid molecules will depend upon the molecular weight cut-off selected for filtration apparatus 28). Filtration apparatus may be an ultrafiltration apparatus such as an ultrafiltration membrane array. The molecular weight cut-off level of filtration apparatus 28 should be above the upper end of the molecular weight range for fulvic acid molecules, and thus should be more than about 12,500 Daltons. Higher molecular weight cut-off levels could be utilized. For example, it would be possible to use a 15,000 Dalton ultrafiltration membrane array, or a 25,000 Dalton ultrafiltration membrane array as filtration apparatus 28. Other molecular weight cut-off levels could be selected.

The retentate 28b from filtration apparatus 28 will include humin molecules while allowing the solubilized fulvic acid molecules to pass through and also allowing at least some of the humic acid molecules to pass through (depending upon the molecular weight cut-off level selected from filtration apparatus 28, some humic acid molecules may be retained as part of retentate 28b).

Like the method illustrated in FIG. 1, the method illustrated in FIG. 2 can include the addition of a phosphate for the purpose of precipitating any iron and aluminum in the mixture as iron phosphate and aluminum phosphate, and removing any such precipitated compounds in order to improve the purity of the fulvic acid end-product obtained. This can occur at any time prior to filtering the mixture through filtration apparatus 24. Again the pH of the mixture is preferably adjusted to about 5 to 8 for the phosphate addition step since iron phosphate is least soluble in this range.

As shown in FIG. 2, the phosphate addition step may be carried out after filtering the mixture through filtration apparatus 28 but before filtering through filtration apparatus 24. While it would be possible to carry out the phosphate addition step before filtering the mixture through filtration apparatus 28, it is preferred to do so after since some iron and aluminum may be removed as part of retentate 28b, meaning that less of phosphate 30 would be required for the phosphate addition step (resulting in lower costs).

The phosphate addition step in FIG. 2 involves the addition of a phosphate 30 (which may be any of the particular phosphate compounds mentioned above) in tank 32 after filtering the mixture through filtration apparatus 28. Any precipitated iron phosphate and aluminum phosphate is removed as part of retentate 34b from filter 34 (which may have a similar porosity as filter 16 or filter 20), while the filtrate 34a from filter 34 is passed to filtration apparatus 24 for filtering as mentioned above. Retentate 34b is passed to unit 22 for waste or further processing. Again, the pH of the mixture is preferably adjusted to about 5 to 8 for the phosphate addition step. As mentioned above, depending upon the pH of the mixture before the addition of the phosphate, this can be accomplished by the addition of the phosphate, the addition of an alkali as mentioned above or an acid as mentioned above. If the phosphate addition step is to be carried out after filtering through the filtration apparatus 28, it may be desirable to add an alkali 36 to the mixture prior to filtering through filtration apparatus 28 to increase the pH of the mixture to at least 9.4 in order to increase the solubility of the humic acid and fulvic acid molecules prior to filtering through filtration apparatus 28, thus increasing the separation of fulvic acid molecules prior to filtration by filtration apparatus 24. The pH of the mixture may be adjusted by the addition of an alkali 36 to the mixture in tank 38 prior to filtering through filtration apparatus 28. Alkali 36 may be any of the compounds mentioned above in relation to alkali 14 in FIG. 1. If the pH of the mixture is increased to at least 9.4 prior to filtering through filtration apparatus 28, then preferably the pH of filtrate 28a from filtration apparatus 28 is adjusted to about 5 to 8 for the addition of phosphate 30. This may be accomplished by the addition of an acid 40 (which may be any of the acids mentioned previously) in tank 32.

The filtrate 28a is filtered through filtration apparatus 24, either directly if the phosphate addition step is not carried out (in which case tank 32, filter 34, tank 38, alkali 36, acid 40 and phosphate 30 would not be present as illustrated in FIG. 2), or after being subjected to the phosphate addition step and subsequent filtration through filter 34. The retentate 24b from filtration apparatus 24 includes at least some (and preferably all or substantially all) of the humic acid molecules, while allowing at least some of the fulvic acid molecules to pass through within filtrate 24a, which may be then filtered through filtration apparatus 26 as mentioned above.

There are many different commercially-available filtration apparatuses which may be used as filtration apparatuses 24, 26 and 28 in the methods of the present invention.

EXAMPLE 1

The following example is presented by way of illustration and not by way of limitation.

900 gallons of water were mixed with 1000 lbs. of leonardite which was previously ground to an average particle size of 6 microns. 50 lbs. of well-aged compost was added in order to inoculate the mixture with microorganisms. The mixture was then digested under aeration for 3 days. Then, 20 lbs of potassium phosphate was added to the mixture. The pH of the mixture was slowly increased to between 5 to 8 by the addition of 100 lbs. of sodium bicarbonate to precipitate out iron and aluminum as insoluble phosphate compounds. The mixture was then filtered using a 200 mesh screen and allowed to settle for 6 days. The mixture was then heated at a temperature of about 60° C. and air sparged for 10 minutes. The heated mixture was then passed through a 20 micron filter and retained solids were removed. The filtrate was then passed through an 8000 Dalton ultrafiltration membrane array. The retentate was removed and the filtrate was passed through a 600 Dalton ultrafiltration membrane array. The 600 Dalton ultrafiltration membrane array retained about 20% of the water as part of the retentate and about 80% passed through as part of the filtrate. The filtrate from this ultrafiltration membrane was removed and the retentate comprising fulvic acid molecules was retained. The retentate comprised about 1.25% (wt %) dissolved solids, including fulvic acid molecules. The colour of the retentate solution was dark brown, but diluted to a bright yellow colour when diluted fourfold with water. The lack of red colour in the retentate solution indicates an absence of iron in an appreciable quantity.

The fulvic acid molecules extracted by methods according to the present invention can be used in a number of fulvic acid products having agricultural and horticultural applications. For example, fulvic acid concentrates or solutions can be produced for use as a plant sprays, soil additives or additions to fertilizers. The invention includes fulvic acid products comprising fulvic acid molecules extracted from humus material according to the methods of the invention. For example, the invention includes solutions produced according to the methods of the invention.

The present invention thus provides for methods for extracting fulvic acid molecules from a humus material which, relative to the traditional base-acid extraction method, renders yields having increased amounts of fulvic acid molecules with decreased amounts of iron, salts, silica and other organic compounds. Moreover, the methods of the present invention are environmentally sensitive and may use far less chemicals than the traditional base-acid extraction methods. It is expected that certain fulvic acid end products produced according to the methods of this invention will obtain a certified "organic" designation. For example, an "organic" fulvic acid end product may be obtained according to a method of this invention when calcium phosphate is the phosphate 12 added to the mixture and calcium carbonate or sodium bicarbonate is added to the mixture as alkali 14. Moreover, it has been found possible to produce a fulvic acid solution with a near neutral pH from oxidized lignite according to a method of the invention.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A method for extracting molecules of fulvic acid from a humus material comprising molecules of humin, humic acid and fulvic acid, the method comprising the steps of: (a) mixing the humus material with water to solubilize at least some of the molecules of fulvic acid; and (b) separating at least some of the solubilized fulvic acid molecules from the humin molecules and from at least some of the humic acid molecules by ultrafiltration, and further comprising, between steps (a) and (b), a digestion step comprising contacting microorganisms with the mixture in the presence of oxygen to oxidize any unoxidized organic compounds in the humus material.

2. The method according to claim 1 wherein the microorganisms are bacteria, protozoa, fungi or a mixture of two or more members selected from the group consisting of bacteria, protozoa and fungi.

3. The method according to claim 1 wherein the microorganisms are contacted with the mixture by adding compost, compost tea, soil or manure to the mixture, the compost, compost tea, soil or manure comprising the microorganisms.

4. The method according to claim 1 wherein air is bubbled through the mixture during the digestion step.

5. The method according to claim 1 wherein at least some of the solubilized fulvic acid molecules are separated from at least some of the humic acid molecules by filtering the mixture through a first filtration apparatus which retains at least some of the humic acid molecules while allowing at least some of the solubilized fulvic acid molecules to pass through, wherein at least some of the solubilized fulvic acid molecules are separated from the humin molecules before or during filtering the mixture through said first filtration apparatus, wherein the first filtration apparatus is an ultrafiltration apparatus.

6. The method according to claim 5 wherein the first filtration apparatus retains particles or compounds having a molecular weight of about 2500 to 12,500 Daltons.

7. The method according to claim 6 wherein the first filtration apparatus retains particles or compounds having a molecular weight of at least about 8000 Daltons.

8. The method according to claim 5 further comprising, after step (b), the step of (c) separating at least some of the solubilized fulvic acid molecules from part of the water by ultrafiltration or nanofiltration.

9. The method according to claim 8 wherein step (c) further comprises separating at least some of the solubilized fulvic acid molecules from any salts in the mixture by ultrafiltration or nanofiltration.

10. The method according to claim 8 wherein step (c) is carried out by filtering the mixture through a second filtration apparatus after being filtered through the first filtration apparatus, wherein the second filtration apparatus retains at least some of the solubilized fulvic acid molecules while allowing part of the water to pass through, wherein the second filtration apparatus is an ultrafiltration apparatus or a nanofiltration apparatus.

11. The method according to claim 9 wherein step (c) is carried out by filtering the mixture through a second filtration apparatus after being filtered through the first filtration apparatus, wherein the second filtration apparatus retains at least some of the solubilized fulvic acid molecules while allowing part of the water and any salts in the mixture to pass through, wherein the second filtration apparatus is an ultrafiltration apparatus or a nanofiltration apparatus.

12. The method according to claim 10 wherein the second filtration apparatus retains all or substantially all of the fulvic acid molecules which have passed through the first filtration apparatus.

13. The method according to claim 10 wherein the second filtration apparatus retains particles or molecules having a molecular weight of about 250 to 1000 Daltons.

14. The method according to claim 13 wherein the second filtration apparatus retains particles or molecules having a molecular weight of at least about 600 Daltons.

15. The method according to claim 10 wherein the second filtration apparatus retains part of the water, thereby leaving the separated fulvic acid molecules from step (c) in a solution.

16. The method according to claim 15 further comprising the step of reducing the water content of the solution obtained from step (c) to concentrate the solution.

17. The method according to claim 15 further comprising the step of drying the solution obtained from step (c) to leave the fulvic acid in a powder.

18. The method according to claim 5 wherein the first filtration apparatus allows all or substantially all of the solubilized fulvic acid molecules to pass through.

19. The method according to claim 10 wherein the mixture is filtered through a third filtration apparatus before being filtered through the first filtration apparatus, wherein the third filtration apparatus retains the humin molecules and at least some of the humic acid molecules while allowing the solubilized fulvic acid molecules and at least some of the humic acid molecules to pass through, wherein the third filtration apparatus is an ultrafiltration apparatus.

20. The method according to claim 19 wherein the third filtration apparatus retains particles or molecules having a molecular weight of more than about 12,500 Daltons.

21. The method according to claim 20 wherein the third filtration apparatus retains particles or molecules having a molecular weight of at least about 25,000 Daltons.

22. The method according to claim 18 wherein the first filtration apparatus retains all or substantially all of the humic acid molecules.

23. The method according to claim 19 wherein all or substantially all of the humic acid molecules are retained by one or both of the first filtration apparatus and the third filtration apparatus.

24. The method according to claim 5 further comprising, after step (a) but before filtering the mixture through the first filtration apparatus, the steps of adjusting the pH of the mixture to about 5 to 8, adding a phosphate to the mixture to precipitate any iron and any aluminum in the humus material as iron phosphate and aluminum phosphate and separating any precipitated iron phosphate and aluminum phosphate from the fulvic acid molecules.

25. The method according to claim 24 wherein the phosphate is selected from the group consisting of monopotassium phosphate, dipotassium phosphate, tripotassium phosphate, sodium pyrophosphate, magnesium phosphate, calcium phosphate, and mixtures of two or more members selected from the group consisting of monopotassium phosphate, dipotassium phosphate, tripotassium phosphate, sodium pyrophosphate and calcium phosphate.

26. The method according to claim 24 wherein the phosphate is phosphoric acid.

27. The method according to claim 24 wherein the addition of the phosphate to the mixture is sufficient to adjust the pH of the mixture to about 5 to 8.

28. The method according to claim 24 wherein an acid is added to the mixture to adjust the pH of the mixture to about 5 to 8.

29. The method according to claim 28 wherein the acid is selected from the group consisting of phosphoric acid, acetic acid, citric acid, hydrochloric acid and sulfuric acid and mixtures of two or more members selected from the group consisting of phosphoric acid, acetic acid, citric acid, hydrochloric acid and sulfuric acid.

30. The method according to claim 24 wherein an alkali is added to the mixture to adjust the pH of the mixture to about 5 to 8.

31. The method according to claim 30 wherein the alkali is selected from the group consisting of monopotassium phosphate, dipotassium phosphate, tripotassium phosphate, sodium carbonate, sodium bicarbonate, potassium bicarbonate, calcium carbonate, calcium-magnesium carbonate, potassium hydroxide and sodium hydroxide and mixtures of two or more members selected from the group consisting of monopotassium phosphate, dipotassium phosphate, tripotassium phosphate, sodium pyrophosphate, magnesium phosphate, calcium phosphate, sodium carbonate, sodium bicarbonate, potassium bicarbonate, calcium carbonate, calcium-magnesium carbonate, potassium hydroxide and sodium hydroxide.

32. The method according to claim 19 further comprising, after filtering the mixture through the third filtration apparatus and before filtering through the first filtration apparatus, the steps of adjusting the pH of the mixture to about 5 to 8, adding a phosphate to the mixture to precipitate any iron and any aluminum in the humus material as iron phosphate and aluminum phosphate and separating any precipitated iron phosphate and aluminum phosphate from the fulvic acid molecules.

33. The method according to claim 32 wherein the phosphate is selected from the group consisting of monopotassium phosphate, dipotassium phosphate, tripotassium phosphate, sodium pyrophosphate, magnesium phosphate, calcium phosphate, and mixtures of two or more members selected from the group consisting of monopotassium phosphate, dipotassium phosphate, tripotassium phosphate, sodium pyrophosphate and calcium phosphate.

34. The method according to claim 32 wherein the phosphate is phosphoric acid.

35. The method according to claim 32 wherein the pH of the mixture is adjusted to at least about 9.4 prior to filtering the mixture through the third filtration apparatus and wherein the pH of the mixture is adjusted, by the addition of an acid, to about 5 to 8 after filtering the mixture through the third filtration apparatus.

36. The method according to claim 35 wherein the acid is selected from the group consisting of phosphoric acid, acetic acid, citric acid, hydrochloric acid and sulfuric acid and mixtures of two or more members selected from the group consisting of phosphoric acid, acetic acid, citric acid, hydrochloric acid and sulfuric acid.

37. The method according to claim 35 wherein the pH of the mixture is adjusted to at least about 9.4 by the addition of an alkali.

38. The method according to claim 37 wherein the alkali is selected from the group consisting of monopotassium phosphate, dipotassium phosphate, tripotassium phosphate, sodium carbonate, sodium bicarbonate, potassium bicarbonate, calcium carbonate, calcium-magnesium carbonate, potassium hydroxide and sodium hydroxide and mixtures of two or more members selected from the group consisting of monopotassium phosphate, dipotassium phosphate, tripotassium phosphate, sodium pyrophosphate, magnesium phosphate, calcium phosphate, sodium carbonate, sodium bicarbonate, potassium bicarbonate, calcium carbonate, calcium-magnesium carbonate, potassium hydroxide and sodium hydroxide.

39. The method according to claim 1 wherein the humus material comprises one or more members selected from the group consisting of peats, oxidized lignites, peat moss, composts, brown coals, soil, pond sediment and biosolids.

40. The method according to claim 39 wherein the humus material comprises oxidized lignite, and wherein the oxidized lignite is leonardite.

41. The method according to claim 1 wherein the humus material is ground prior to being mixed with the water in step (a).

42. The method according to claim 1 wherein the mixture in step (a) comprises from about 3% to about 35% by weight of the humus material.

43. The method according to claim 1 further comprising the step of heating the mixture prior to step (b).

44. The method according to claim 43 wherein the mixture is heated at a temperature from about 50° C. to 70° C.

45. The method according to claim 1 further comprising allowing the mixture to settle prior to step (b).

46. The method according to claim 5 further comprising the step of filtering the mixture to remove particles of a chosen size prior to filtering the mixture through the first filtration apparatus.

47. The method according to claim 1 wherein the water in step (a) is provided in an aqueous solution which is mixed with the humus material.

48. A method for producing an agricultural or horticultural solution comprising fulvic acid molecules, the method comprising:
(a) mixing a humus material comprising molecules of humin, humic acid and fulvic acid with water to solubilize at least some of the fulvic acid molecules;
(b) filtering the mixture through a first filtration apparatus which is configured to retain particles or molecules having a molecular weight of 2500 to 12,500 Daltons to separate at least some of the fulvic acid molecules from at least some of the humic acid molecules, the humin molecules being separated from the fulvic acid molecules prior to or during filtering the mixture through the first filtration apparatus; and
(c) passing the filtrate from the first filtration apparatus through a second filtration apparatus, wherein the second filtration apparatus retains at least some of the solubilized fulvic acid molecules and some of the water, thereby producing the solution, and
further comprising, between steps (a) and (b), a digestion step comprising contacting microorganisms with the mixture in the presence of oxygen to oxidize any unoxidized organic compounds in the humus material.

49. The method according to claim 48 wherein the second filtration apparatus is configured to retain particles or molecules having a molecular weight of about 250 to 1000 Daltons.

50. The method according to claim 49 wherein the mixture is filtered through a third filtration apparatus prior to being filtered through the first filtration apparatus, the third filtration apparatus retaining the humin molecules and at least some of the humic acid molecules while allowing the solubilized fulvic acid molecules to pass through, wherein the third filtration apparatus is configured to retain particles or molecules having a molecular weight of more than about 12,500 Daltons.

51. The method according to claim 50 further comprising, after filtering the mixture through the third filtration apparatus and before filtering the mixture through the first filtration apparatus, the steps of adjusting the pH of the mixture to about 5 to 8, adding a phosphate to the mixture to precipitate any iron and any aluminum in the humus material as iron phosphate and aluminum phosphate and separating any precipitated iron phosphate and aluminum phosphate from the fulvic acid molecules.

52. A method for extracting molecules of fulvic acid from a humus material comprising molecules of humin, humic acid and fulvic acid, the method comprising the steps of:
(a) mixing ground humus material with water to solubilize at least some of the fulvic acid molecules;
(b) contacting microorganisms with the mixture in the presence of oxygen for a period of 1 to 7 days to oxidize any unoxidized organic compounds in the humus material;
(c) adding a phosphate to the mixture and adjusting the pH of the mixture to about 5 to 8 to precipitate any iron and any aluminum in the humus material as iron phosphate and aluminum phosphate, wherein any precipitated iron phosphate and aluminum phosphate is removed in one or more of steps (d), (g) and (h);
(d) passing the mixture through a first filter, the pores of the first filter being sized to retain particles have a size of at least 74 microns, the filtrate from the first filter comprising a mixture of a solution comprising fulvic acid molecules and solids having sizes smaller than about 74 microns;
(e) allowing the filtrate from the first filter to settle for a period of time;
(f) heating the filtrate from the first filter at temperature from about 50° C. to 70° C.;
(g) passing the filtrate from the first filter through a second filter, the pores of the second filter being sized to retain particles having a size of about 5 to 30 microns, the filtrate from the second filter comprising a mixture of a solution comprising the solubilized fulvic acid molecules and particles having sizes smaller than about 5 to 30 microns;
(h) passing the filtrate from the second filter through a first filtration apparatus, wherein the first filtration apparatus is an ultrafiltration apparatus which retains all or substantially all of the remaining humin and humic acid molecules while allowing the solution comprising the solubilized fulvic acid molecules to pass through;
(i) passing the filtrate from the first filtration apparatus through a second filtration apparatus, wherein the second filtration apparatus is an ultrafiltration apparatus or a nanofiltration apparatus, and wherein the second filtration apparatus retains all or substantially all of the fulvic acid molecules while allowing at least part of the water to pass through.

53. A method for extracting molecules of fulvic acid from a humus material comprising molecules of humin, humic acid and fulvic acid, the method comprising:
(a) mixing ground humus material with water to solubilize at least some of the fulvic acid molecules;
(b) contacting microorganisms with the mixture in the presence of oxygen to oxidize any unoxidized organic compounds in the humus material;
(c) filtering the mixture through a first filtration apparatus, wherein the first filtration apparatus retains the humin molecules and at least some of the humic acid molecules while allowing the solubilized fulvic acid molecules to pass through the first filtration apparatus, wherein the first filtration apparatus is configured to retain particles or molecules having a molecular weight of more than about 12,500 Daltons;
(d) adjusting the pH of the mixture to about 5 to 8;
(e) adding a phosphate to the mixture to precipitate any iron and any aluminum in the humus material as iron phosphate and aluminum phosphate;
(f) removing any precipitated iron phosphate and aluminum phosphate from the mixture;
(g) filtering the mixture through a second filtration apparatus to separate at least some of the fulvic acid molecules from at least some of the humic acid molecules, wherein the second filtration apparatus is configured to retain particles or molecules having a molecular weight of about 2500 to 12,500 Daltons; and (h) filtering the mixture through a third filtration apparatus, wherein the third filtration apparatus retains all or substantially all of the fulvic acid molecules which passed through the second filtration apparatus while allowing at least part of the water to pass through, wherein the third filtration apparatus is configured to retain particles or molecules having a molecular weight of about 250 to 1000 Daltons.

* * * * *